UNITED STATES PATENT OFFICE.

ROBERT R. ABBOTT, OF CLEVELAND, OHIO, ASSIGNOR TO THE CASE HARDENING SERVICE COMPANY, OF CLEVELAND, OHIO, A CORPORATION OF OHIO.

CARBONIZING MATERIAL FOR STEEL ARTICLES.

1,265,158.　　　　　Specification of Letters Patent.　　Patented May 7, 1918.

No Drawing.　　　Application filed August 7, 1913.　Serial No. 783,534.

*To all whom it may concern:*

Be it known that I, ROBERT R. ABBOTT, a citizen of the United States, residing at Cleveland, in the county of Cuyahoga and State of Ohio, have invented a certain new and useful Improvement in Carbonizing Material for Steel Articles, of which the following is a full, clear, and exact description.

This invention relates to a process of carbonizing steel billets and articles, and more particularly relates to certain material with which the steel billets or articles are heated, in order to produce the carbonizing effect.

Generally speaking, the invention comprises the elements and combinations thereof set forth in the accompanying claims.

My process consists in general in heating steel billets or steel articles to suitable temperatures while these articles are in contact with a mixture of an organic compound containing cellulose and a carbonate salt, or in contact with the gases produced by heating such a mixture.

For the purpose, I have found that uncharred wood in the form of sawdust, shavings or chips is a very efficient and cheap form of cellulose, while soda-ash (sodium carbonate) produces excellent results in the mixture.

When utilizing uncharred wood, such as sawdust and soda ash, I have obtained very good results when employing from 5 to 30 per cent. of soda ash, and 95 to 70 per cent. of sawdust.

Somewhat better results have been obtained when using from 10 to 30 per cent. of soda-ash, and 90 to 70 per cent. of sawdust, and perhaps the best results when using substantially 15 per cent. of soda ash, and substantially 85 per cent. of sawdust.

I am aware that it has been proposed heretofore to use charcoal for the same purpose as I use uncharred wood in my mixture, but I find that the uncharred wood has a very superior action, and advantage over the charred wood, in that the volatile carbon products and oils contained in the sawdust are volatilized in the early heating stages and carbon is deposited upon the surfaces of the article being treated, and subsequently as the articles are further heated, this carbon is absorbed by the articles into the body thereof.

In practising my process, I place the articles to be treated in closed receptacles, the articles being entirely surrounded and packed in the carbonizing mixture. The covers of the receptacles are luted with clay and the receptacles are then placed in a furnace which is heated from 1500° to 2100° F.

Having thus described my invention, what I claim is:

1. A carbonizing mixture for steel articles comprising sawdust and soda-ash.

2. A carbonizing mixture for steel articles comprising 95 to 70 per cent. of an organic compound containing cellulose, and 5 to 30 per cent. of a carbonate.

In testimony whereof, I hereunto affix my signature in the presence of two witnesses.

ROBERT R. ABBOTT.

Witnesses:
A. J. HUDSON,
L. I. PORTER.

Copies of this patent may be obtained for five cents each, by addressing the "Commissioner of Patents, Washington, D. C."